Nov. 3, 1964   C. L. C. CHAPMAN ETAL   3,154,847
METHOD OF WELDING SILVER ELEMENTS
Filed Jan. 19, 1959   2 Sheets-Sheet 1
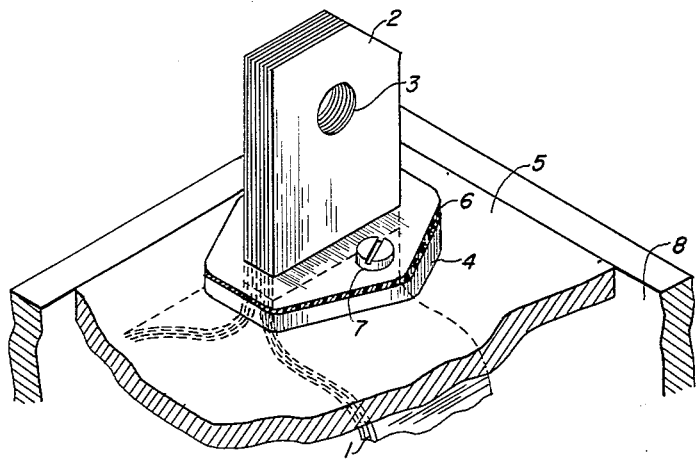
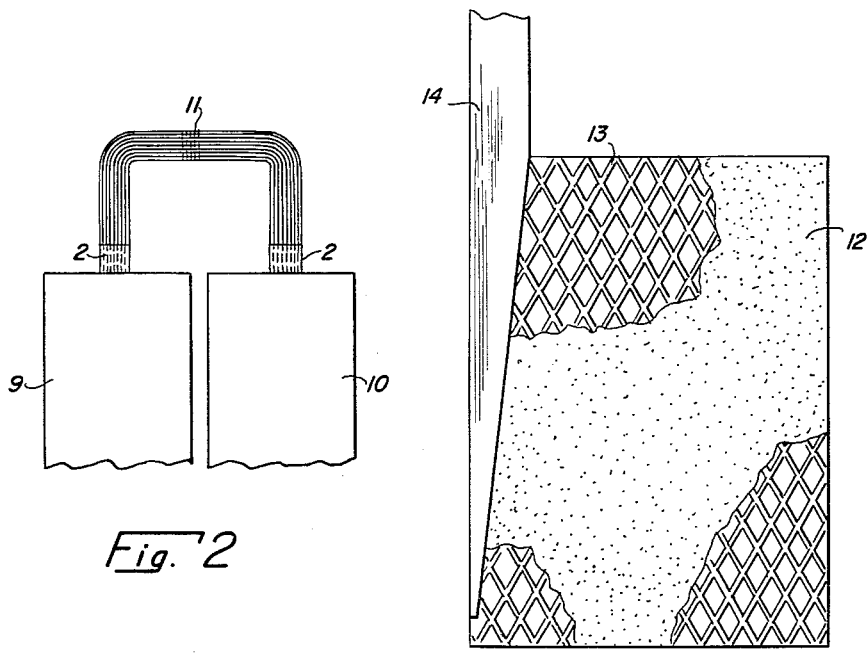
INVENTORS:
CHRISTOPHER L.C. CHAPMAN
NORMAN NORRIS
BY
AGENT

United States Patent Office

3,154,847
Patented Nov. 3, 1964

3,154,847
METHOD OF WELDING SILVER ELEMENTS
Christopher L. C. Chapman, Sutton, and Norman Norris, Norbiton, England, assignors to Yardney International Corp., New York, N.Y., a corporation of New York
Filed Jan. 19, 1959, Ser. No. 787,573
Claims priority, application Great Britain, Jan. 20, 1958, 1919/58
1 Claim. (Cl. 29—494)

Our present invention relates to a process for joining together two metallic elements through the application of heat and pressure.

In many instances, as in the establishment of a connection between a battery electrode and associate terminal, it is desirable to form a bond of great mechanical strength and low electrical resistance between two metallic bodies. If these bodies are heated above the melting point of either or both of them, good contact will be obtained but objectionable deformation may occur. At considerably lower temperatures, on the other hand, the bond obtained by heat alone and/or by heat and pressure will often be unsatisfactory.

It is, accordingly, an object of our invention to provide a process for the bonding of metallic bodies in a manner obviating the disadvantages pointed out above.

A more particular object of this invention is to provide a process for producing an improved bond between two members of metallic silver.

We have found that a major obstacle to the pressure-bonding of metals at temperatures below their melting points lies in the formation, on exposure to the atmosphere, of a compound on the surface of either or both bodies which interferes with the contact between the two surfaces. Such compounds will often form, even after thorough preliminary cleaning of the surfaces to be joined, at a certain critical temperature and will remain stable up to a higher temperature which is still below the melting point of the metal itself, the compound at such higher temperature losing its identity through decomposition, melting, volatilization or sublimation. We have found, in accordance with this invention, that an excellent bond may be obtained between two metallic bodies if they are pressed together at a temperature lower than their melting points but high enough to destroy the aforementioned compound.

In the case of silver, more specifically, the compound of interest in conjunction with the present invention is silver sulfide which at elevated temperatures and in the presence of oxygen is converted to silver oxide, the latter decomposing at 300° C. In accordance with a particular feature of our invention, therefore, we propose to join together two bodies of metallic silver by heating them to a temperature not less than 300° C. but preferably not exceeding 500° C., at the same time applying to them a pressure advantageously ranging between substantially 0.1 and 1 ton per cm.² Heat and pressure should be maintained for preferably 15 to 20 seconds. The resulting bond has high mechanical strength and excellent electrical conductivity.

It will be understood that the bodies to be joined together by the process according to the invention need not consist in their entirety of the metal or metals referred to but may merely be coated on their surfaces with such metal (e.g. silver).

The invention will be described in greater detail with reference to the accompanying drawing in which:

FIG. 1 shows a fragmentary perspective view of a terminal assembly of an electric battery, produced by the process according to our invention;

FIG. 2 is an elevational view of a modified terminal assembly embodying the invention;

FIG. 3 shows, in elevation, a battery electrode provided with a terminal lug by our improved process;

Figure 4:
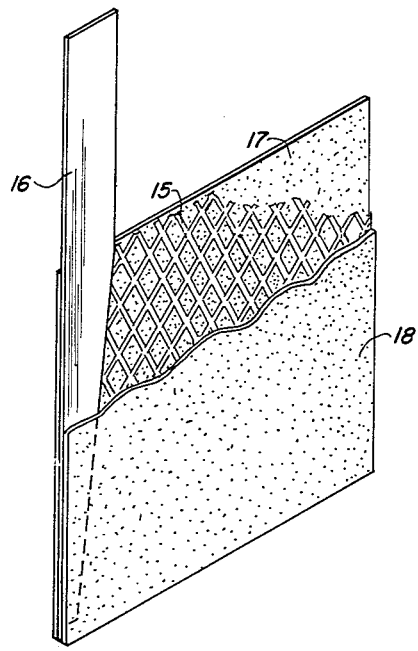
FIG. 4 is a perspective view of an electrode similar to that of FIG. 3.

In FIG. 1 there is shown a portion of a battery casing 8 having the usual two terminals of which only one has been illustrated, at 2. To form this terminal, a plurality of sheet-silver terminal lugs 1 from corresponding battery plates (not shown) are brought together at their ends and subjected to a pressure between 0.1 and 1 ton per cm.² at a temperature between 300° C. and 500° C., for a period of 15 to 20 seconds, so that these ends are pressure-welded together into a solid, homogeneous structure. The latter then has its edges machined and a hole 3 formed through it. A terminal plate 4, provided with a central slot closely surrounding the terminal 2, sits on the lid 5 of casing 8 and is soldered or welded to the lower half of the terminal. The lid 5 has two apertures (only one shown) each traversed with clearance by the corresponding terminal and is fastened to its plate 4 by screws 7 which pass through a gasket 6 and engage threaded holes formed in the lid. The edges of the lid 5 are pasted or welded to the walls of the cell casing 8. It will be appreciated that the construction described above provides a leak-proof arrangement for the terminal of a cell, which has in the past been difficult to achieve, and furthermore affords a very rigid connection of low electrical resistance between the terminal and its associated electrode plates.

FIG. 2 of the drawing shows an arrangement in which two cells 9 and 10 each have corresponding terminal lugs pressure-welded together in a manner similar to the arrangement of FIG. 1. Two lugs from each cell are, however, continued beyond the upstanding legs 2 and are interleaved and pressure-welded together into a terminal loop 11 of inverted U-shape through which parallel external connections to the two cells 9 and 10 can be made.

FIG. 3 shows a positive plate 12 of sintered silver on a reticulated support 13 of expanded silver to which a terminal lug 14 of silver strip is pressure-welded in the manner previously described.

FIG. 4 shows a positive plate comprising a grid 15 of expanded silver to which a silver terminal lug 16 is pressure-welded. Two sintered plate elements 17 and 18, each formed without internal support, are pressure-welded onto opposite sides of the grid 15. This arrangement has the advantage that the plate elements 17 and 18 are bonded to the grid 15 only at their inner surfaces so that the meshes of the grid are not penetrated by the active material of these elements. Thus the plate has greater porosity, particularly in the region of its median plane, than has been possible with known constructions.

Figure 5:
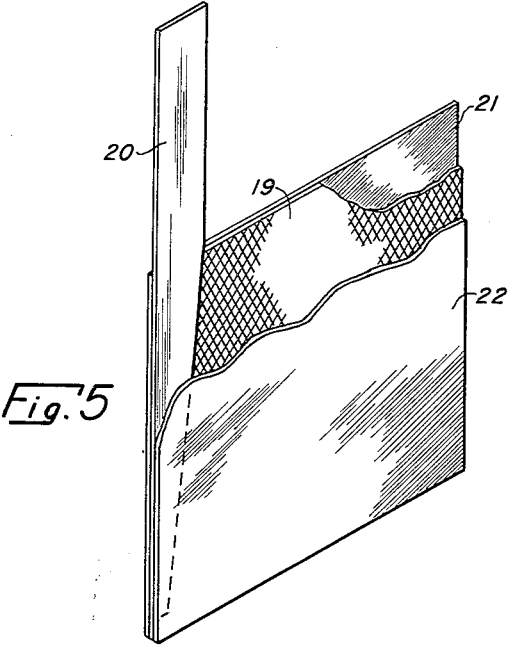
FIG. 5 is a perspective view, similar to FIG. 4, of another battery electrode embodying the invention.

FIG. 5 shows a negative plate comprising a support 19 of silver-plated copper mesh pressure-welded to a silver terminal lug 20. Negative electrode elements 21 and 22 of zinc mesh are pressure-welded one on each side of the support 19. The area of the plate overlapped by the lug 20 is then subjected to a further pressing operation to reduce the combined thickness approximately to that of the remainder of the plate. This construction is particularly advantageous since in the past such negative plates have been assembled by spot welding which has been a time-consuming and expensive operation and furthermore has not been found entirely successful in the case of very fine zinc mesh or the like since spot welding tends to create holes in such mesh.

The strength and durability of the bond produced by our improved process can be traced directly to the removal of sulfides and similar compounds from the contact surface by the bonding process itself. Various types of apparatus suitable for the practice of our process, generally comprising a pair of heated platens, are well-known and need not be particularly described.

We claim:

A process for joining together elements of metallic silver having formed thereon, upon exposure to the atmosphere, a coating of silver sulfide which is resistant to pressure-bonding, comprising the steps of bringing said elements together and forming an assembly therefrom, heating said assembly in the temperature range of about 300° to 500° C. in air and simultaneously subjecting said assembly to a pressing operation at a pressure of about 0.1 to 1 ton per cm.$^2$, the heat treatment and pressing operation being carried out for about 15 to 20 seconds.

References Cited in the file of this patent

UNITED STATES PATENTS

| | | |
|---|---|---|
| 2,018,343 | Bienfait et al. | Oct. 22, 1935 |
| 2,438,721 | Spencer | Mar. 30, 1948 |
| 2,490,776 | Braunsdorff | Dec. 13, 1949 |
| 2,539,246 | Hensel | Jan. 23, 1951 |
| 2,539,298 | Doty et al. | Jan. 23, 1951 |
| 2,707,821 | Sowter | May 10, 1955 |
| 2,798,843 | Slomin et al. | July 9, 1957 |

OTHER REFERENCES

"Silver in Industry," by Adams. Published in 1940 by Reinhold Publishing Corp., New York, N.Y., Chapter 6, pages 183–198.

"Cold Welding of Silver II," article publication in the Lehigh University Publications, The Institute of Research, vol. XV, July 1941, No. 7. Pages 341–352.

Handbook of Chemistry and Physics, 1944, Twenty-eighth Edition. Published by Chemical Rubber Publishing Co., Cleveland, Ohio. Pages 488, 489, and 1715.